United States Patent
Sachs et al.

(10) Patent No.: US 10,405,269 B2
(45) Date of Patent: Sep. 3, 2019

(54) SELECTION OF A CAPILLARY NETWORK GATEWAY

(71) Applicant: Telefonaktiebolaget LM Ericsson (publ), Stockholm (SE)

(72) Inventors: Joachim Sachs, Sollentuna (SE); Ari Keränen, Helsinki (FI); Johan Rune, Lidingö (SE); Anders E. Eriksson, Kista (SE); Francesco Militano, Stockholm (SE); Nicklas Beijar, Kirkkonummi (FI); Vlasios Tsiatsis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 281 days.

(21) Appl. No.: 15/307,439

(22) PCT Filed: Apr. 30, 2014

(86) PCT No.: PCT/SE2014/050541
§ 371 (c)(1),
(2) Date: Oct. 28, 2016

(87) PCT Pub. No.: WO2015/167382
PCT Pub. Date: Nov. 5, 2015

(65) Prior Publication Data
US 2017/0048792 A1    Feb. 16, 2017

(51) Int. Cl.
*H04W 48/18* (2009.01)
*H04W 72/08* (2009.01)
(Continued)

(52) U.S. Cl.
CPC ......... *H04W 48/18* (2013.01); *H04W 72/085* (2013.01); *H04W 84/18* (2013.01); *H04W 88/16* (2013.01)

(58) Field of Classification Search
CPC ... H04W 48/18; H04W 72/085; H04W 84/18; H04W 88/16
See application file for complete search history.

(56) References Cited

U.S. PATENT DOCUMENTS

| | | | |
|---|---|---|---|
| 2013/0311640 A1* | 11/2013 | Gleixner | H04W 4/70 709/224 |
| 2014/0079040 A1* | 3/2014 | Smith | H04B 7/18539 370/337 |
| 2014/0086214 A1 | 3/2014 | Hong et al. | |

FOREIGN PATENT DOCUMENTS

| | | |
|---|---|---|
| EP | 2590470 A1 | 5/2013 |
| WO | 2011112683 A1 | 9/2011 |

OTHER PUBLICATIONS

Karunakar Pothuganti et al., 'A Comparative Study of Wireless Protocols: Bluetooth, UWB, Zigbee, and Wi-Fi', Advance in Electronic and Electrical Engineering, vol. 4, No. 6 (2014), pp. 655-662.*

(Continued)

*Primary Examiner* — Melvin C Marcelo
(74) *Attorney, Agent, or Firm* — Sage Patent Group

(57) ABSTRACT

The disclosure relates to a method for selecting a capillary network gateway for a machine device of a capillary network, wherein the machine device is capable of being associated with at least a first and a second capillary network gateway, wherein the first capillary network gateway has a first level of availability and the second capillary network gateway has a second level of availability. The method comprises selecting, for the machine device, the first capillary network gateway for communication of a first type of data and the second capillary network gateway for communication of a second type of data. The disclosure also relates to methods in a node, to machine device, node, computer programs, and computer program codes.

12 Claims, 4 Drawing Sheets

(51) Int. Cl.
    *H04W 84/18*     (2009.01)
    *H04W 88/16*     (2009.01)

(56) References Cited

OTHER PUBLICATIONS

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.

Vázquez-Gallego, F., et al., "DPCF-M: A Medium Access Control Protocol for Dense Machine-to-Machine Area Networks with Dynamic Gateways," IEEE 14th Workshop on Signal Processing Advances in Wireless Communications (SPAWC), Jun. 16-19, 2013, IEEE, pp. 490-494.

International Search Report and Written Opinion for International Patent Application No. PCT/SE2014/050541, dated Jan. 21, 2015, 12 pages.

\* cited by examiner

SELECTION OF A CAPILLARY NETWORK GATEWAY

This application is a 35 U.S.C. § 371 national phase filing of International Application No. PCT/SE2014/050541, filed Apr. 30, 2014, the disclosure of which is incorporated herein by reference in its entirety.

TECHNICAL FIELD

The technology disclosed herein relates generally to the field of capillary networks, and in particular to methods, nodes, computer programs and computer program products for selecting a capillary network gateway in such capillary network.

BACKGROUND

A currently foreseen development of communication in cellular networks involves numerous small autonomous devices, which transmit and receive only small amounts of data (or are polled for data) occasionally, e.g. once a week or once per minute. These devices are sometimes referred to as Machine Type Communication (MTC) devices, Machine-to-Machine (M2M) devices or just Machine Devices (MDs), and are assumed not to be associated with humans, but are rather sensors or actuators of different kinds, which communicate with application servers within or outside the cellular network. The application server configures and receives data from the MTC devices. Hence, this type of communication is often referred to as machine-to-machine (M2M) communication.

So far focus has been directed to MDs being directly connected to the cellular network via the radio interface of the cellular network. However, a scenario which is likely to be more prevalent is that MDs connect to the cellular network via a gateway. In such scenarios the gateway acts like a communication device (which may also be denoted user equipment, UE) towards the cellular network while maintaining a local network, typically based on a short range radio technology towards the MDs. Such a local network, which in a sense extends the reach of the cellular network (to other radio technologies but not necessarily in terms of radio coverage), has been coined capillary network and the gateway connecting the capillary network to the cellular network is referred to as a capillary network gateway (CGW).

FIG. 1 illustrates such capillary network 1, comprising a number of machine devices $2_1$, $2_2$, $2_3$ communicating with a CGW $4_1$, $4_2$ over a first air interface 3 typically implementing a short range radio technology. The CGWs $4_1$, $4_2$ are in turn communicating with a node $5_1$, $5_2$ of the cellular network 6 over a second air interface 7. An application server 8 is also illustrated. The MDs $2_1$, $2_2$, $2_3$ are typically relayed to such an application server 8 through the cellular network 6, whereby the MDs $2_1$, $2_2$, $2_3$ are able to exchange data with applications of the application server 8.

When designing the capillary network several considerations have to be made. All MDs need of course to be able to reach a CGW and the selection is today based on some channel quality metric. The number of CGWs thus needs to be high enough to ensure that all MDs are sufficiently close to a CGW to have a channel quality enabling communication with the application servers. This is in contrast with the desire of the operators of the capillary networks, who would like to keep down the costs of the networks, e.g. by providing as few CGWs as possible. An increased transmission power could be used, enabling MDs to reach CGWs that are located further away and thereby reducing the number of required CGWs. However, the MDs are most often battery operated and an increased transmission power is therefore disadvantageous e.g. in that the energy consumption would increase. The MDs have to be very energy efficient, as external power supplies are typically not available and since it is neither practically or economically feasible to frequently replace or recharge their batteries.

There is thus a tradeoff between the requirement of high communication reliability and the costs related thereto.

Further, the capillary network may comprise both advanced CGWs that are connected to an electricity mains supply as well as more simple CGWs that are battery operated like the MDs. Irrespectively of type of CGWs, they should be managed efficiently in order to provide reliable communication means for the MDs while keeping down the operating costs of the capillary network.

SUMMARY

An object of the present teachings is to solve or at least alleviate at least one of the above mentioned problems.

The object is according to a first aspect achieved by a method for selecting a capillary network gateway for a machine device of a capillary network, wherein the machine device is capable of being associated with at least a first and a second capillary network gateway, wherein the first capillary network gateway has a first level of availability and the second capillary network gateway has a second level of availability. The method comprises selecting, for the machine device, the first capillary network gateway for communication of a first type of data and the second capillary network gateway for communication of a second type of data.

The method provides an improved selection of capillary network gateway, enabling a machine device to associate with capillary network gateways e.g. having different sleep cycles. The machine device is ensured of having at all times, or nearly always, connectivity to a capillary network gateway without requiring all capillary network gateways to be available always, or nearly always. By means of the method some, or all, of the capillary network gateways may be allowed to have a longer sleep period, prolonging their operation time on battery provided power. The method thus provides advantages in increased operation time of machine devices as well as capillary gateways. Another advantage provided by the method is reduced costs for the operator of the capillary network in that a minimum number of more advanced capillary gateways with more electrical power available (battery or fixed supply) is required to ensure support of high-priority traffic.

The object is according to a second aspect achieved by a machine device for selecting a capillary network gateway of a capillary network, wherein the machine device is capable of being associated with at least a first and a second capillary network gateway, wherein the first capillary network gateway has a first level of availability and the second capillary network gateway has a second level of availability. The machine device comprises:
 a processor; and
 a memory storing instructions that, when executed by the processor, causes the machine device to:
  select the first capillary network gateway for communication of a first type of data and the second capillary network gateway for communication of a second type of data.

The object is according to a third aspect achieved by a computer program for a machine device for selecting a capillary network gateway of a capillary network, wherein the machine device is capable of being associated with at least a first and a second capillary network gateway, wherein the first capillary network gateway has a first level of availability and the second capillary network gateway has a second level of availability. The computer program comprises computer program code, which, when run on the machine device causes the machine device to:

select the first capillary network gateway for communication of a first type of data and the second capillary network gateway for communication of a second type of data.

The object is according to a fourth aspect achieved by a computer program product comprising a computer program as above, and a computer readable means on which the computer program is stored.

The object is according to a fifth aspect achieved by a machine device for selecting a capillary network gateway of a capillary network. The machine device is capable of being associated with at least a first and a second capillary network gateway, wherein the first capillary network gateway has a first level of availability and the second capillary network gateway has a second level of availability. The machine device comprises means for selecting the first capillary network gateway for communication of a first type of data and the second capillary network gateway for communication of a second type of data.

The object is according to a sixth aspect achieved by a method performed in a node of a communication system comprising a machine device and at least two capillary network gateways. The method comprises:

associating the machine device with at least a first and a second capillary network gateway, wherein the first capillary network gateway has a first level of availability and the second capillary network gateway has a second level of availability, and configuring the machine device with a first and a second capillary network gateway such as to use the first capillary network gateway for communication of a first type of data and use the second capillary network gateway for communication of a second type of data.

The object is according to a seventh aspect achieved by a node of a communication system comprising a machine device and at least two capillary network gateways. The node comprises a processor; and a memory storing instructions that, when executed by the processor, causes the node to:

associate the machine device with at least a first and a second capillary network gateway, wherein the first capillary network gateway has a first level of availability and the second capillary network gateway has a second level of availability, and configure the machine device with a first and a second capillary network gateway, such as to use the first capillary network gateway for communication of a first type of data and use the second capillary network gateway for communication of a second type of data.

The object is according to an eight aspect achieved by a computer program for a node of a communication system comprising a machine device and at least two capillary network gateways. The computer program comprising computer program code, which, when run on the node causes the node to:

associate the machine device with at least a first and a second capillary network gateway, wherein the first capillary network gateway has a first level of availability and the second capillary network gateway has a second level of availability, and configure the machine device with a first and a second capillary network gateway, such as to use the first capillary network gateway for communication of a first type of data and use the second capillary network gateway for communication of a second type of data.

The object is according to a ninth aspect achieved by a computer program product comprising a computer program as above, and a computer readable means on which the computer program is stored.

The object is according to a tenth aspect achieved by a node of a communication system comprising a machine device and at least two capillary network gateways. The node comprises means for associating the machine device with at least a first and a second capillary network gateway, wherein the first capillary network gateway has a first level of availability and the second capillary network gateway has a second level of availability, and means for configuring the machine device with a first and a second capillary network gateway, such as to use the first capillary network gateway for communication of a first type of data and use the second capillary network gateway for communication of a second type of data.

Further features and advantages of the present disclosure will become clear upon reading the following description and the accompanying drawings.

DETAILED DESCRIPTION

Figure 1:
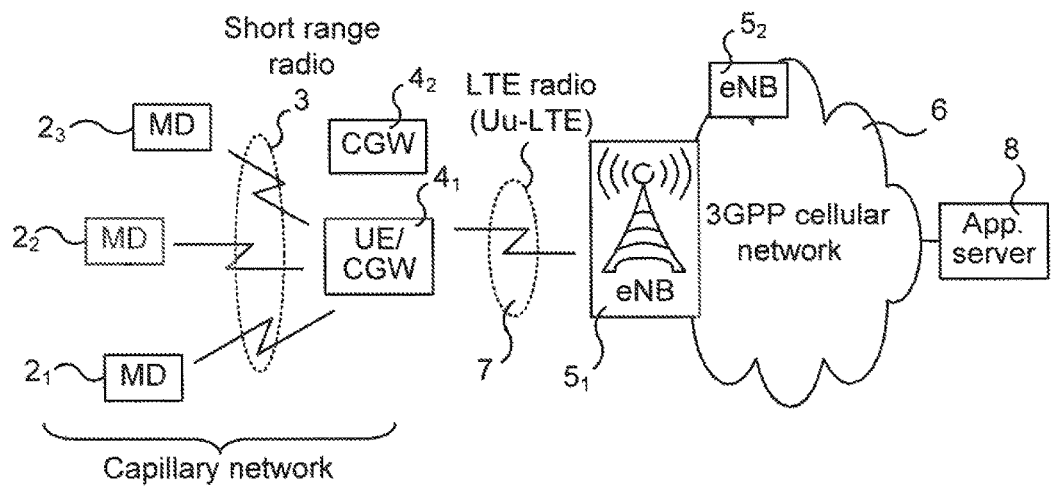
FIG. 1 illustrates schematically a capillary network and a cellular network.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
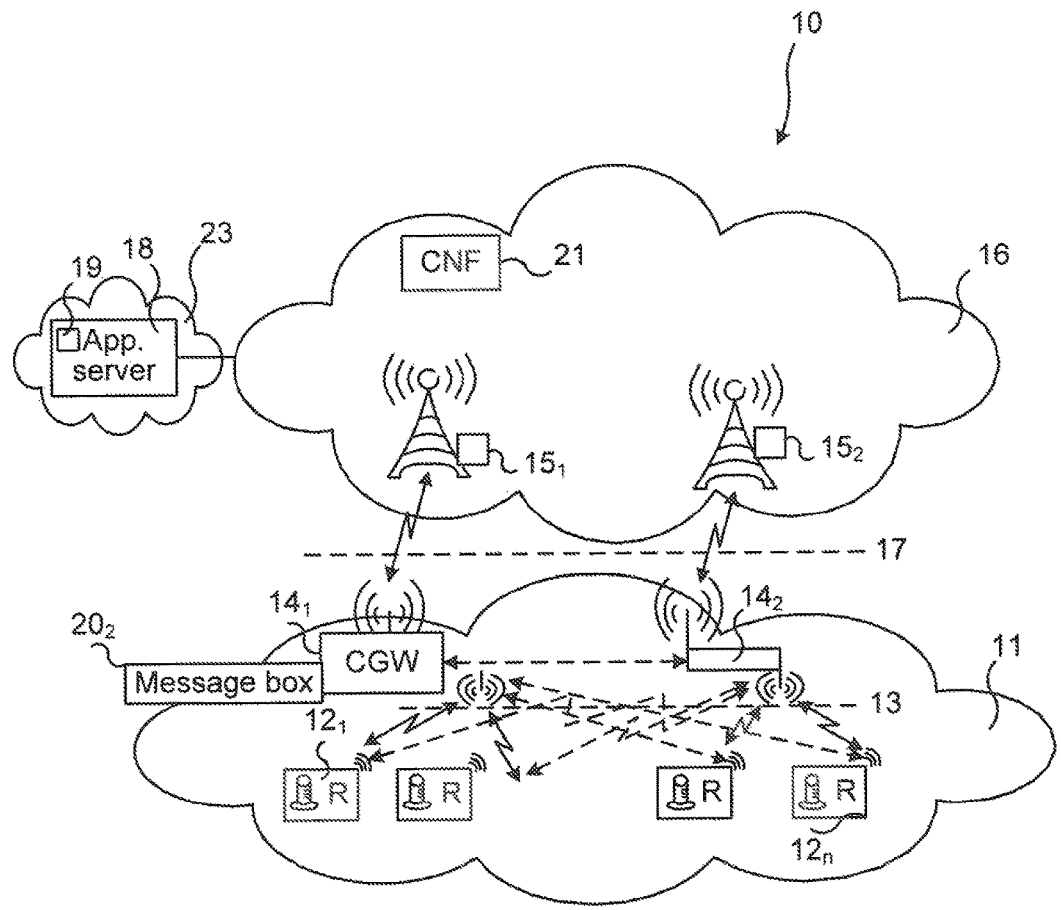
FIG. 2 illustrates an environment in which embodiments of the present disclosure may be implemented.

FIG. 2 illustrates an environment in which embodiments of the present disclosure may be implemented. It is initially noted that embodiments of the present disclosure are mainly described and exemplified by using LTE as the radio access technology over the air interface between the CGW and the cellular network (also denoted wireless network in the following). The teachings of the present disclosure may however be applied also to other radio access technologies, such as e.g. Global System for Mobile Communications (GSM) or Universal Mobile Telecommunications System (UMTS).

FIG. 2 thus illustrates a communication system 10 in which embodiments of the present disclosure may be implemented. The communication system 10 comprises one or more capillary networks 11 (only one illustrated) and a wireless network 16 and possibly an external packet data network (PDN) 23. The PDN 23 may e.g. comprise a third party service provider's network (e.g. owned by a service provider other than the operator of the wireless network 16), i.e. it may be an operator external public or private PDN or an intra operator PDN, e.g. for provisioning IP Multimedia Subsystem (IMS) services. Such PDN 23 may for instance be the Internet. It is noted that the communication system 10 may comprise any number of capillary networks (although only one is illustrated in FIG. 2). A capillary network may be defined in different ways, e.g. based on its various connectivity abilities. A capillary network may for example be seen as any kind of extension of a cellular network (e.g. 3GPP network) changing radio access technology (compared to the cellular network).

The capillary network 11 comprises one or more Machine Type Communication devices (MTC devices), which in the following are denoted machine devices (MDs) $12_1, \ldots, 12_n$. The capillary network 11 further comprises one or more capillary network gateways (CGWs) $14_1, 14_2$. The MDs $12_1, \ldots, 12_n$ are capable to (e.g. configured to) communicate with the CGW $14_1, 14_2$, and/or with other MDs $12_1, \ldots, 12_n$ over a first air interface 13 (schematically illustrated by the dashed line 13). The first air interface 13 may implement a short range radio technology, such as for example IEEE 802.15.4 (e.g. with 6LoWPAN or ZigBee as the higher layers), Bluetooth Low Energy or low energy versions of the IEEE 802.11 family, (i.e. Wireless Local Area Networks, or WiFi). In FIG. 2, the communication over this first air interface 13 is illustrated by the various arrows between the MDs $12_1, \ldots, 12_n$ and between the MDs $12_1, \ldots, 12_n$ and the CGWs $14_1, 14_2$. The MDs $12_1, \ldots, 12_n$ may for example comprise metering devices, actuators or sensors, e.g. electricity meters.

Two CGWs that are not directly connected to each other (e.g. do not interface each other directly), may be considered to belong to different capillary networks, or considered to belong to the same capillary network e.g. if connected to same Packet Data Network Gateway. Aspects of the present disclosure are applicable to various cases, in which there is a need for selection of CGW. Examples of such cases comprise two or more capillary networks each comprising one CGW, one capillary network comprising two or more CGWs, or a combination thereof. In the following, a single capillary network comprising two or more CGWs is used for describing aspects of the disclosure, but it is to be noted that other set-ups are possible and within the scope of the present disclosure.

Although not illustrated, the capillary network 11 may comprise a multi-hop network, i.e. some MDs $12_1, \ldots, 12_n$ may have to communicate via one or more other MD(s) $12_1, \ldots, 12_n$ to reach a CGW $14_1, 14_2$. This is often the case e.g. for an IEEE 802.15.4+ZigBee network with the CGW $12_1, 12_2$ acting as a Personal Area Network (PAN) controller. Aspects of the present disclosure are applicable to both such set-ups of the capillary network 11. In the multi-hop case, a routing protocol, such as Routing Protocol for Low-Power and Lossy Networks (RPL), may be used. It is noted that the RPL may, in principle, be used also in single hop networks, although there is typically no need for a routing protocol in such networks.

The CGWs $14_1, 14_2$ are in turn capable to (e.g. configured to) communicate not only with the MDs $12_1, \ldots, 12_n$ but also with a radio access node $15_1, 15_2$ of the wireless network 16 over a second air interface 17 (illustrated by the dashed line 17). When the wireless network 16 is an LTE network, the node may e.g. be an evolved node B (eNB), and the second air interface 17 is then the LTE-Uu-interface. The communication over the second air interface 17 is illustrated by the arrows between the CGWs $14_1, 14_2$ and the nodes $15_1, 15_2$ of the wireless network 16. The CGWs $14_1, 14_2$ are thus interfacing both the MDs $12_1, \ldots, 12_n$ and the wireless network 16. The wireless network 16 may comprise an LTE network, but may alternatively be another type of network, as mentioned earlier.

Figure 3:
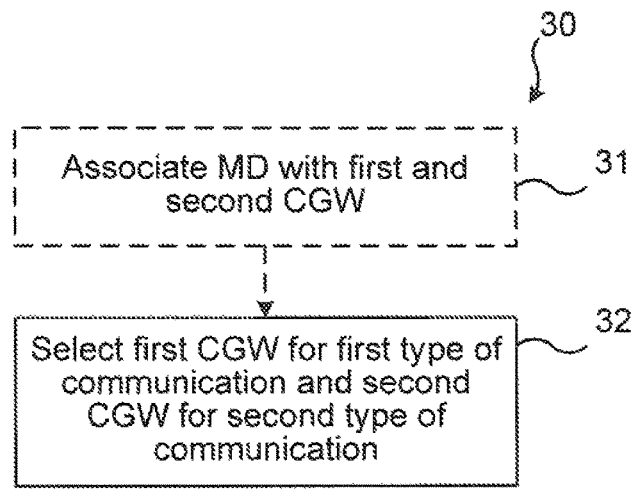
FIG. 3 illustrates a flow chart over steps of a method in accordance with the present disclosure.

The wireless network 16 may comprise a radio access network (RAN) and a core network, the RAN and the core network comprising various network nodes. The wireless network 16 may be an LTE based network, and it is noted that the terms "LTE" and "LTE based" is to be interpreted as encompassing both present and future LTE based systems, such as e.g. advanced LTE systems. The RAN (denoted E-UTRAN in LTE, for Evolved Universal Terrestrial RAN) may comprise nodes such as the mentioned radio access nodes, e.g. eNBs in case of LTE. The core network (known as Evolved Packet Core, EPC, for LTE) may comprise nodes such as e.g. Mobility Management Entity (MME) and packet data network gateway (PDN-GW, or P-GW) (also refer to FIG. 3 for exemplary nodes of the wireless network 16). It should be appreciated that the wireless network 16 may be an LTE based system, but embodiments described herein may also be utilized in connection with other wireless communication systems, such as e.g. GSM or UMTS.

An application server 18 is also illustrated in FIG. 2 comprising one or more applications 19. The application server 18 may be part of the wireless network 16, or be part of the PDN 23 connected to the wireless network 16. The application server 18 comprises applications 19 which may configure the MDs $12_1, \ldots, 12_n$ to e.g. perform a certain action such as perform a reading and send a reading value to it.

The communication system 10, in particular the wireless network 16 thereof, may comprise a node denoted Capillary Network Function (CNF) 21. The CNF 21 may be part of an existing network node, or a standalone node, and provided to support various functions of the capillary network 11. For the present disclosure, one such function may be related to the association of a particular MD $12_1$ with two or more CGWs $14_1, 14_2$.

Briefly, the deployment of multiple capillary networks typically involves CGWs with different capabilities and different configurations, e.g. some CGWs that are always reachable and some CGWs that are duty cycling. Likewise, MDs may send high priority traffic (e.g. emergency) as well as low priority traffic (e.g. periodic status updates). In an aspect, the present disclosure associates an MD with two or several CGWs, one of which provides service for high priority traffic. This allows an MD to save its power by using an ordinary (likely closely located) CGW for regular traffic while using a separate CGW that is likely located farther away and requiring a higher power consumption and which CGW is always reachable for emergency traffic.

An association between the MD and a CGW can be defined in different ways and an association between two devices, in the present case the MD and CGWs, may be seen as having different levels. For example, in a Wi-Fi context "associated with" may be interpreted as having a specific meaning, wherein the MD is associated with an access point when it is authenticated and known by the access point. From the CGW's perspective the MD may be considered as associated when it is known and authenticated by the CGW. Such association also means that traffic to the MD is forwarded by the network 16 via the specific node $15_1$, $15_2$ that is connected to the CGW associated to the MD, i.e. there is a communication route in the network 16 via the associated CGW to the MD. From the MD's perspective association means that the CGW is known (and possibly authenticated) by the MD, and that the MD has selected the associated CGW for sending traffic. In case of multi-hop networks, association also requires that there is a communication route from the MD via intermediate MD's to the CGW. Association from both perspectives is typically required. Association may be seen as the existence of state awareness about the MD and CGW, and the existence of a communication route (awareness of possible intermediate nodes) to be able to send traffic to and from the MD via the given CGW.

In practice, associations are maintained by the various devices and nodes regularly exchanging information.

Essentially, the simplest association is that the MD is aware of a CGW and has the information needed to communicate with it (e.g. radio channel, address, potential intermediate MDs' addresses), and that the CGW is prepared to accept traffic from the MD (e.g. authentication, communication parameters for sending back replies to MD). The association may be created when the MD stores information from the beacon of the CGW and possibly authenticates to the CGW. In the present disclosure thus an MD $12_1$ may be seen as associated with a CGW $14_1$, $14_2$ if it has some type of information about a particular CGW $14_1$, $14_2$ that enables it to connect to this CGW. Such information may for example comprise a radio channel and encryption key used for communication via the CGW and/or the addresses of the CGW. Such required information may for example be conveyed to the MD $12_1$ through beacon messages and the MD $12_1$ may associate/connect to a CGW $14_1$, $14_2$ when it has something to send. There may thus be different levels of association between the MD $12_1$ and the CGW $14_1$, $14_2$, and, for instance, the MD $12_1$ does not need to be authenticated with a CGW $14_1$, $14_2$ in order to be associated with it, but authentication may be one level of association.

It is noted that the association may be implemented to be performed by any element in the communication system 10. A decision about the association (which CGWs to associate a particular MD with) can be done by the CNF 21 (or some other wireless network element), by the CGWs, or by the MD itself (e.g. based on information from the network/ gateways). The association may thus be network-controlled, gateway-controlled or MD-controlled.

The deployment of multiple capillary networks may involve CGWs $14_1$, $14_2$ with different capabilities and different configurations. For example, a few CGWs may be based on robust, secure platforms with constant power supply, while most of the other CGWs may be cost-efficient battery powered devices configured to be sleeping periodically. For alarms and other critical messages, it is important that the traffic is transported with high reliability and low delay. An MD capable of sending critical messages may also send other types of messages having no requirements on delay and reliability. For instance, an MD configured to detect smoke, i.e. acting as a smoke alarm, may need to report once daily (or more frequently) its battery level and/or that it is functional ("alive"), such report messages not being critical messages, but when this MD wakes up due to having detected smoke it needs to send an alarm as soon as possible with high reliability.

In an aspect, the present disclosure associates an MD $12_1$ with two or more CGWs $14_1$, $14_2$. One CGW $14_1$ is deployed to handle critical messages and is therefore available for communication all of the time or at least most of the time. Such CGW $14_1$ may be referred to as a "high-availability CGW". The high-availability CGW $14_1$ may have a fixed power supply and be either constantly awake (i.e. available) or be sleeping only for short durations at a time. The other one or more CGWs $14_2$ may be deployed to handle non-critical messages, such as periodic reports with lower importance. Such CGWs $14_2$ may be allowed to have longer sleep periods. In the present disclosure, the MD $12_1$ is associated with ("knows" or is aware of) at least two CGWs $14_1$, $14_2$, one of which provides the high-availability CGW functionality.

The number of high-availability CGWs in the capillary network is expected to be significantly lower than the number of ordinary CGWs thus, the distance from an MD to a high-availability CGW is on average higher than from an MD to an ordinary CGW. The power consumption of the MD when using the high-availability CGW may consequently be higher than when using the normal CGWs. Therefore, it is advantageous to use an ordinary CGW for the low priority traffic in order to save the power of the MD, and only use the high-availability CGW for messages with critical delay and reliability requirements.

The MD may discover the role (high-availability or ordinary, respectively) of the CGWs by listening to advertisements sent by CGWs. These advertisements can be implemented as extensions to routing protocol messages (e.g. Routing Protocol for Low Power and Lossy Networks, RPL) or to router advertisements. The advertisement sent by a CGW may thus comprise the role of this CGW. In case an MD receives advertisements from several high-availability CGWs, it may be configured to choose one as the active one according to other CGW properties. Examples of such CGW properties comprise signal strength, a channel quality metric, a quality of service metric, security credentials, message relay capability, battery power of the CGWs, load of the CGWs, load of the capillary network 11, load of a communication system 10 interfacing with the capillary network 11, required uplink transmission power.

In other embodiments, the MD may be configured to vary between several active high-availability CGWs to save the power of these CGWs. In particular, by associating with a first such high-availability CGW having the role of high-availability CGW for a first period of time allows the second such high-availability CGW to act as an ordinary CGW during this first period of time and thus to have a sleeping pattern of the ordinary CGWs, thereby saving power. The MD may then switch so as to be associated with the second high-availability CGW having the role of high-availability CGW during a second period of time, allowing the first high-availability CGW to save power in a corresponding manner.

In other embodiments, explicit indications may be used to instruct a particular MD to use a given CGW as its high-availability CGW. This selection may come from a centralized element, e.g. the CNF 21 (see FIG. 2), which may be configured to handle the association of MDs with CGWs, as mentioned earlier. The CNF 21 may collect data about the connectivity between the CGWs and MDs, i.e. with which CGWs each MD can or could communicate. The CNF 21 can be made aware about the roles of the CGWs either by configuration or by signalling received from the CGWs, in which signalling the CGWs inform about their role. The CNF 21 may also receive further information, such as about the power level of CGWs and MDs. Based on this information, and possibly still additional information, the CNF 21 assigns each MD one high-availability CGW. The CNF 21 may send the association indication via the CGWs, which forwards it to the MD.

In other embodiments, several duty cycle patterns may be used, i.e. there can be more than two CGW roles. Each role may have a particular duty cycle. For instance, one role can be always on (duty cycle 100%), and the other roles have different duration of sleep. The duty cycle may be defined as the percentage of one period in which CGW is active, for example a CGW that is on for one second of 100 seconds then has a duty cycle of 1%. It is however noted that it is not only the percentage of time that the CGW is available that is relevant, but also how often it is available.

Thus, there are different degrees of availability among the CGWs. An MD selects the CGW or set of CGWs that matches its delay requirements or the CGW that is the following one to wake up. For example, an MD that only reports infrequent measurements without requirements on timely delivery may choose a CGW that wakes up a few times a day, while a MD (e.g. an actuator) that needs to be accessible with low delay chooses a CGW that has short sleep periods. Both MDs in this example may use a third CGW for alarm messages.

In other embodiments, the role of high-availability CGW is rotated between CGWs. In such embodiments, every CGW in the capillary network 11 may be similar to each other e.g. regarding capabilities and power source. For each time period, e.g. for one week, one CGW is selected to be the high-availability CGW and the other CGWs are ordinary CGWs. After this period, the high-availability CGW is re-selected, e.g. in a round-robin fashion.

The high-availability CGW is for the duration of this period configured as always on or nearly-always on, while all other CGWs are duty cycling. At the start of the period, MDs may be reconfigured with their selection of high-availability and ordinary CGWs. In such embodiments, an advantage is that the battery consumption is distributed evenly between the CGWs, avoiding a situation wherein the batteries of a particular CGW would drain faster.

The selection of roles for a CGW can be manual or automatic. In the manual case, the operator of the capillary network 11 manually configures sets of roles and their validity times in the CGWs $14_1$, $14_2$. This relies on synchronized clocks between the CGWs $14_1$, $14_2$. At the beginning of each time period, the roles switches according to the configuration and the CGWs $14_1$, $14_2$ are reconfigured to their new roles. The CGWs $14_1$, $14_2$ may then start advertising their new roles to the MDs $12_1$, . . . , $12_n$.

In the automatic case, a central node, e.g. the CNF 21, receives the connectivity information about which CGWs $14_1$, $14_2$ each MD $12_1$, . . . , $12_n$ can reach. The CNF 21 may also receive further information about the power level of CGWs $14_1$, $14_2$ and MDs $12_1$, . . . , $12_n$. Based at least on the connectivity information, and possibly further information, the CNF 21 may assign the high-availability CGW role to a set of CGWs, so that each MD $12_1$, . . . , $12_n$ can reach at least one high-availability CGW $14_1$. The CNF 21 sends a message describing their role (high-availability or ordinary) to each CGW $14_1$, $14_2$, which then includes the roles in their advertisements to the MDs $12_1$, . . . , $12_n$. The association selection is performed again by the CNF 21 after a given time period, whereas the CNF 21 tries to avoid selecting as a high-availability CGW $14_1$ a CGW that has recently been in that role.

In other embodiments, a higher transmission power is used to communicate with the high-availability CGW $14_1$. The number of high-availability CGWs in the capillary network 11 may be lower than the number of ordinary CGWs. Therefore the distance from an MD to the high-availability CGW is, on average, larger. There is typically also an increased need for reliability in the situations when the high-availability CGW is used. In this solution variant, the MD $12_1$ switches to a higher transmission power when it communicates via the high-availability CGW $14_1$. This allows longer distances, i.e. a lower number of high-availability CGWs in the capillary network, and additionally increases the reliability. Correspondingly, the high-availability CGW uses higher transmission power than ordinary CGWs when communicating with MDs.

In other embodiments, the MD may, even though being associated with at least two CGWs, use only one of them for all type of traffic. For example, an MD may during some conditions select a high-availability CGW also for low-priority traffic. In particular, if the high-availability CGW has enough available capacity, e.g. in terms of load, battery, processing power, etc., for serving also low-priority traffic, then it can do it for a number of MDs. The CGW may then be advertised as both a low-availability and a high-availability CGW.

From the above, it is clear that the present disclosure provides a number of advantages. For example, the disclosure improves the CGW selection in capillary networks by taking additional information into account when making the decision. Further, the disclosure allows an MD to have always (or nearly always) available connectivity to a CGW without requiring all CGWs to be always (or nearly always) available. This allows most of the CGWs to have a longer sleep period in order to prolong operation on battery power. Still further, an MD's use of CGWs that have long sleep periods in spite of the existence of always-on CGWs is motivated by the higher cost of using a always-on CGW that are typically (on average) located farther away. Thus, the network operator only needs to supply a minimal number of wall-powered CGWs (that are more expensive to deploy than battery powered CGWs) that are sufficient to support high-priority traffic with the highest transmission power. For other traffic, battery powered CGWs are used, whereas the MD can communicate with a closely located CGW with lower power.

Figure 4:
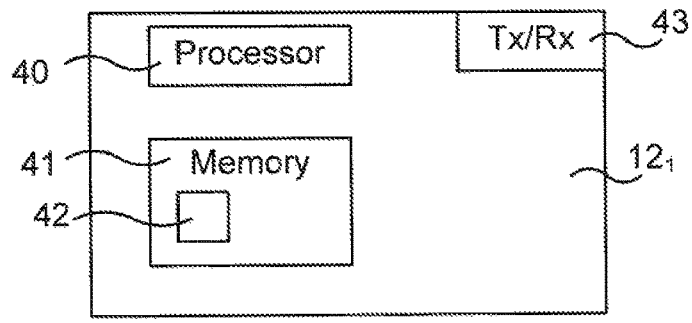
FIG. 4 illustrates schematically a machine device and means for implementing methods of the present disclosure.

The various embodiments and features of selecting a CGW $14_1$, $14_2$ based on (at least) their availability as has been described can be combined in different ways. FIG. 4 illustrates a flow chart over steps of a method in accordance with the present disclosure. The method 30 for selecting a capillary network gateway $14_1$, $14_2$ for a machine device $12_1$ of a capillary network 11 may be performed in a machine device 12 or the various steps may be distributed between a network node (e.g. CGW $14_1$, $14_2$ or CNF 21) and the machine device $12_1$. The machine device $12_1$ is capable of (e.g. configured to) being associated 31 with at least a first and a second capillary network gateway $14_1$, $14_2$, wherein the first capillary network gateway $14_1$ has a first level of availability and the second capillary network gateway $14_2$ has a second level of availability.

The method 30 comprises selecting 32, for the machine device $12_1$, the first capillary network gateway $14_1$ for communication of a first type of data and the second capillary network gateway $14_1$ for communication of a second type of data. The machine device $12_1$ selects one of the associated capillary network gateways to be used for a given type of traffic (or type of message or type of data). This selection is done on a per-message basis depending on the type of message. The selection is done by the machine device $12_1$ since only the machine device $12_1$ knows the type of message it is going to send.

In an embodiment, the first level of availability comprises availability at all times or a duty cycle equal to or higher than a first availability threshold, and the second level of availability comprises a duty cycle lower than the first availability threshold. For example, the first level of availability may comprise availability at all times or comprising a duty cycle higher than a first availability threshold of 90%, and the second level of availability may comprise a duty cycle between 10% and 80%, or a duty cycle below 10%, e.g. 5%. It is noted that the availability of a CGW may be stated in terms of sleep intervals or latencies. A CGW with a high availability may for instance be always awake or waking up 10 times per second and the availability may then be expressed accordingly as having no sleep intervals or having 10 sleep intervals per second.

In an embodiment, the first type of data comprises delay critical data and the second type of data comprises delay tolerant data. The first type of data, or first type of message or traffic, may comprise one or more of: emergency alarms, critical alarms, emergency actuation commands, critical actuation commands. The second type of data, or second type of message or traffic, may comprise one or more of status updates, battery level updates, ordinary sensor reports (e.g. even if a fire alarm does not detect a fire, it might still report the current detected smoke level and/or temperature), responses to management commands etc.

In various embodiments, the method 30 is performed in the machine device $12_1$. In one such embodiment, the method 30 comprises associating 31 the machine device $12_1$ with the at least first and second capillary network gateway $14_1$, $14_2$ by receiving, in the machine device $12_1$, messages from two or more capillary network gateways $14_1$, $14_2$ of one or more capillary networks 11, the messages comprising information about the level of availability of the respective capillary network gateways $14_1$, $14_2$, and associating, in the machine device $12_1$, the machine device $12_1$ with a first and a second capillary network gateway $14_1$, $14_2$ based on the received levels of availability. The messages may for example comprise broadcast messages or messages from the CNF 21 conveyed by the capillary network gateways $14_1$, $14_2$.

In a variation of the above embodiment, the method 30 comprises, when receiving messages from several candidate capillary network gateways fulfilling availability requirements relating to the first and/or second type of data, associating to a first and/or second capillary network gateway $14_1$, $14_2$ based further on one or more of: a channel quality metric, a quality of service metric, security credentials, message relay capability, battery power of the capillary network gateways $14_1$, $14_2$, load of the capillary network gateway $14_1$, $14_2$, load of the capillary network 11, load of a communication system 10 interfacing with the capillary network 11, required uplink transmission power.

In another embodiment, wherein the method 30 is performed in the machine device 121, the method 30 comprises increasing, in the machine device $12_1$, transmission power when communicating with the first capillary network gateway $14_1$. That is, when the machine device $12_1$ is about to send critical type of data (e.g. a message comprising data indicating an emergency), then it may increase its transmission power. This increase still further the reliability of transfer of this type of data.

In an embodiment, the method 30 comprises associating 31, in the capillary network gateway $14_1$, $14_2$ or in a node 21 of a communication system 10, the machine device $12_1$ with at least a first and a second capillary network gateway $14_1$, $14_2$, wherein each capillary network gateway $12_1$, $12_2$ is capable of communication with the communication system 10, and configuring the machine device $12_1$ with a first and a second capillary network gateway $14_1$, $14_2$ based on established levels of availability of the respective capillary network gateways $14_1$, $14_2$. The association 31 may thus be performed in the capillary network gateway $14_1$, $14_2$ or in another node 21 of the communication system 10, while the selecting is performed by the machine device $12_1$. The CGW or the node 21 establishes levels of availability of the CGWs and configures the machine device with the CGWs selected for this MD to be associated with. More generally, the CGW or the node 21 may, after having established the availability information, in turn inform the MDs about the association, whereby the machine device $12_1$ is able to select a proper CGW based on type of data that it is about to send.

In a variation of the above embodiment, when several candidate capillary network gateways fulfil availability requirements relating to the first and/or second type of data, the associating 31 the machine device $12_1$ to a first and/or second capillary network gateway $14_1$, $14_2$ is further based on one or more of: a channel quality metric, a quality of service metric, security credentials, message relay capability, battery power of the capillary network gateways $14_1$, $14_2$, load of the capillary network gateway $14_1$, $14_2$, load of the capillary network 11, load of a communication system 10 interfacing with the capillary network 11, required uplink transmission power. A still further improved CGW selection is thereby provided.

In a variation of the above embodiment, the method 30 comprises changing level of availability of the at least first and second capillary network gateway $14_1$, $14_2$, and repeating the associating 31. An advantage of such embodiment is that battery consumption may be evenly distributed among the CGWs by changing availability (i.e. changing "roles" of the CGWs).

In various embodiments, the method 30 is performed in the capillary network gateway ($12_1$, $12_2$) and comprising increasing the transmission power when communicating the first type of data.

In an embodiment, the method 30 comprises establishing a parameter value relating to capacity of the first capillary network gateway $14_1$, and selecting, for a parameter value meeting a threshold value, the first capillary network gateway $14_1$ also for the second type of data. The parameter value relating to the capacity of the first capillary network gateway $14_1$ may for example comprise load, battery, and/or processing power of the first capillary network gateway $14_1$. The parameter value may be established by the machine device $12_1$ receiving such information from the CNF 21 or from the CGWs directly. The parameter value may be established by the CNF 21 or the CGW by these nodes keeping track of such parameter value.

It is noted that the method 30 may be implemented entirely in the MD $12_1$ or be implemented such as to perform the association between the MD $12_1$ and the at least two CGWs $14_1$, $14_2$ in a node of the communication system 10, for example in the CGW $14_1$, $14_2$ or in the wireless network 16 (e.g. in an CNF 21 thereof).

FIG. 4 illustrates schematically a node, in particular an MD $12_1$, and means for implementing methods of the present disclosure. The MD $12_1$ may for example be an actuator or measurement device or the like, and comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method as described e.g. in relation to FIG. 3.

The MD $12_1$ comprises means 43 for communicating wirelessly with the capillary network gateway $14_1$, $14_2$. Such means may for example comprise antennas and circuitry for receiving and transmitting wireless signals.

A machine device $12_1$ is thus provided for selecting a capillary network gateway $14_1$, $14_2$ of a capillary network 11, wherein the machine device 12 is capable of being associated with at least a first and a second capillary network gateway $14_1$, $14_2$, wherein the first capillary network gateway $14_1$ has a first level of availability and the second capillary network gateway $14_2$ has a second level of availability. The machine device $12_1$ comprises:
 a processor 40; and
 a memory 41 storing instructions that, when executed by the processor, causes the machine device $12_1$ to:
 select the first capillary network gateway $14_1$ for communication of a first type of data and the second capillary network gateway $14_1$ for communication of a second type of data.

In an embodiment, the first level of availability comprises availability at all times or a duty cycle equal to or higher than a first availability threshold, and wherein the second level of availability comprises a duty cycle lower than the first availability threshold.

In an embodiment, the first type of data comprises delay critical data such as emergency alarms and the second type of data comprises delay tolerant data such as status updates.

In an embodiment, the machine device $12_1$ is configured to associate with the at least first and second capillary network gateway $14_1$, $14_2$ by:
 receiving messages from two or more capillary network gateways $14_1$, $14_2$ of one or more capillary networks 11, the messages comprising information about the level of availability of the respective capillary network gateways $14_1$, $14_2$, and
 associating the machine device $12_1$ with a first and a second capillary network gateway $14_1$, $14_2$ based on the received levels of availability.

In a variation of the above embodiment, the machine device $12_1$ is configured to, when receiving messages from several candidate capillary network gateways fulfilling availability requirements relating to the first and/or second type of data, associate to a first and/or second capillary network gateway $14_1$, $14_2$ based further on one or more of: a channel quality metric, a quality of service metric, security credentials, message relay capability, battery power of the capillary network gateways $14_1$, $14_2$, load of the capillary network gateway $14_1$, $14_2$, load of the capillary network 11, load of a communication system 10 interfacing with the capillary network 11, required uplink transmission power.

In an embodiment, the machine device $12_1$ is configured to increase transmission power when communicating with the first capillary network gateway $14_1$.

In an embodiment, the machine device $12_1$ is configured to:
 establish a parameter value relating to capacity of the first capillary network gateway $14_1$, and
 select, for a parameter value meeting a threshold value, the first capillary network gateway $14_1$ also for the second type of data.

Still with reference to FIG. 4, the memory 41 can be any combination of read and write memory (RAM) and read only memory (ROM). The memory 41 also comprises persistent storage, which, for example, can be any single one or combination of magnetic memory, optical memory, solid state memory or even remotely mounted memory.

A data memory (not illustrated) may also be provided for reading and/or storing data during execution of software instructions in the processor 40. The data memory can be any combination of read and write memory (RAM) and read only memory (ROM).

The present disclosure also encompasses a computer program product 41 comprising a computer program 42 for implementing the methods as described above, and a computer readable means on which the computer program 42 is stored. The computer program product 41 may be any combination of read and write memory (RAM) or read only memory (ROM). The computer program product 41 may also comprise persistent storage, which for example can be any single one or combination of magnetic memory, optical memory or solid state memory.

The present teachings thus comprise a computer program 42 for a machine device $12_1$ for selecting a capillary network gateway $14_1$, $14_2$ of a capillary network 11, wherein the machine device $12_1$ is capable of being associated with at least a first and a second capillary network gateway $14_1$, $14_2$, wherein the first capillary network gateway $14_1$ has a first level of availability and the second capillary network gateway $14_2$ has a second level of availability. The computer program 42 comprises computer program code, which, when run on the machine device $12_1$ causes the machine device $12_1$ to select, for the machine device $12_1$, the first capillary network gateway $14_1$ for communication of a first type of data and the second capillary network gateway $14_1$ for communication of a second type of data.

The computer program product, or the memory, thus comprises instructions executable by the processor. Such instructions may be comprised in a computer program, or in one or more software modules or function modules.

Figure 5:
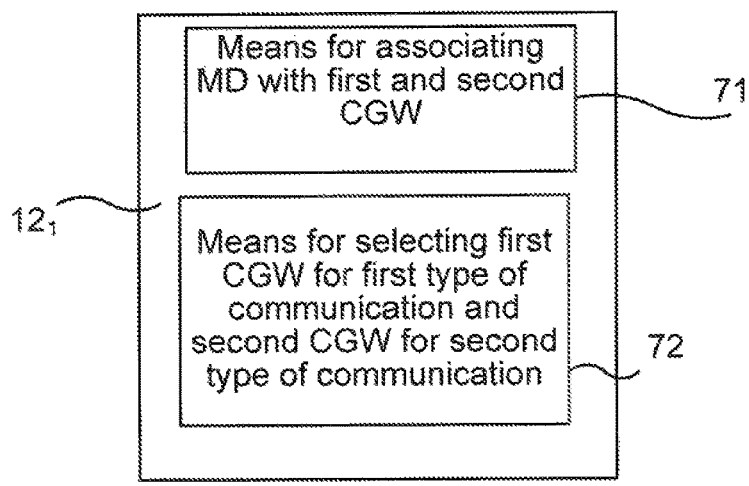
FIG. 5 illustrates a machine device comprising functions modules/software modules for implementing methods of the present disclosure.

An example of an implementation using functions modules/software modules is illustrated in FIG. 5 in particular illustrating machine device $12_1$ comprising function modules for implementing methods of the present disclosure. The machine device $12_1$ comprises first means 71, for example a first function module, for selecting the first capillary network gateway $14_1$ for communication of a first type of data and the second capillary network gateway $14_1$ for communication of a second type of data.

The machine device $12_1$ may comprise second means 72, for example a second function module, for associating the machine device $12_1$ with first and second capillary network gateway $14_1$, $14_2$.

The functional modules 71, 72 can be implemented using software instructions such as computer program executing in a processor and/or using hardware, such as application specific integrated circuits, field programmable gate arrays, discrete logical components etc.

Figure 6:
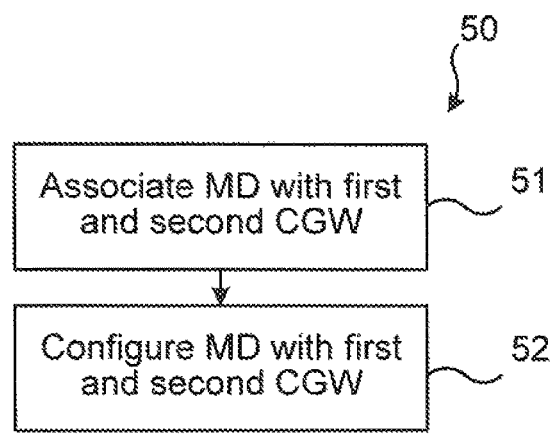
FIG. 6 illustrates a flow chart over steps of a method in a node in accordance with the present disclosure.

FIG. 6 illustrates a flow chart over steps of a method in a network node, e.g. in the CGW $14_1$, $14_2$, or in the CNF 21, in accordance with the present disclosure. The method 50 may thus be performed in a node $14_1$, 21 of a communication system 10 comprising a machine device $12_1$ and at least two capillary network gateways $14_1$, $14_2$. The method 50 comprises associating 51 the machine device $12_1$ with at least a first and a second capillary network gateway $14_1$, $14_2$, wherein the first capillary network gateway $14_1$ has a first level of availability and the second capillary network gateway $14_2$ has a second level of availability. As has been described earlier, the node $14_1$, 21 may establish availability of capillary network gateways $14_1$, $14_2$ in different ways, e.g. by obtaining such information from the capillary network gateways $14_1$, $14_2$ and/or from other nodes within the communication system 10.

The method 50 comprises configuring 52 the machine device $12_1$ with a first and a second capillary network gateway $14_1$, $14_2$, such as to use the first capillary network gateway $14_1$ for communication of a first type of data and use the second capillary network gateway $14_1$ for communication of a second type of data. The machine device $12_1$ may for example be configured by sending a configuration message to it.

In an embodiment, when several candidate capillary network gateways fulfil availability requirements relating to the first and/or second type of data, the associating 51 the machine device $12_1$ to a first and/or second capillary network gateway $14_1$, $14_2$ is further based on one or more of: a channel quality metric, a quality of service metric, security credentials, message relay capability, battery power of the capillary network gateways $14_1$, $14_2$, load of the capillary network gateway $14_1$, $14_2$, load of the capillary network 11, load of a communication system 10 interfacing with the capillary network 11, required uplink transmission power.

In an embodiment, the method 50 comprises changing level of availability of the at least first and second capillary network gateway $14_1$, $14_2$, and repeating the associating 51 and configuring 52.

In an embodiment, the method 50 comprises increasing the transmission power when communicating the first type of data.

Figure 7:
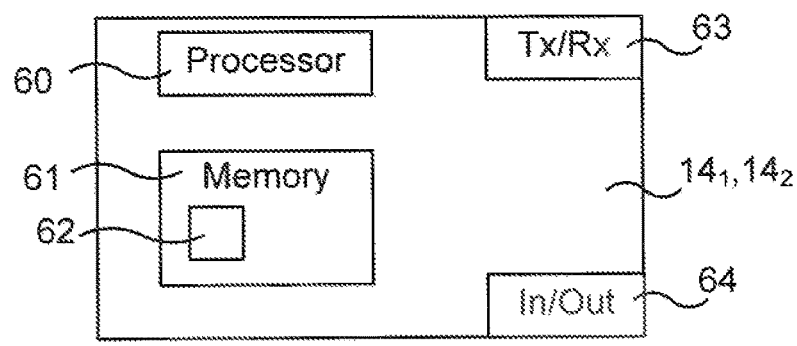
FIG. 7 illustrates schematically a node and means for implementing methods of the present disclosure.
Figure 8:
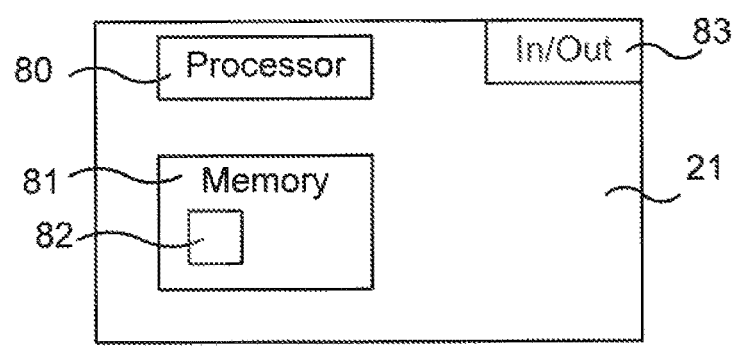
FIG. 8 illustrates schematically a node and means for implementing methods of the present disclosure.

FIGS. 7 and 8 illustrate schematically a node and means for implementing methods of the present disclosure. FIG. 7 illustrates a capillary network gateway $14_1$ and FIG. 8 illustrates a CNF 21, located e.g. in the wireless network 16 (compare FIG. 2 and related description). The capillary network gateway $14_1$ comprises means 63 for communicating with the machine devices $12_1$ and also means for communicating with the wireless network 16. Such means is illustrated schematically at reference numeral 63 (FIG. 7, compare also FIG. 2 and related description of the capillary network gateway $14_1$). The means 63 may for example comprise interfaces for wired or wireless communication towards a node of the wireless network 16, antennas and circuitry for receiving wireless signaling from and transmit wireless signaling towards the machine devices etc. The CNF 21 comprises means 83 for communicating with the CGWs of the capillary network(s) 11 and with other nodes within the communication system 10. Such means is illustrated schematically at reference numeral 83 (FIG. 8, compare also FIG. 2 and related description of the CNF). The means 83 may for example comprise interfaces for wired or wireless communication with the CGWs and the other nodes.

Reference is now made simultaneously to FIGS. 7 and 8; the node $14_1$, 21 is a node of a communication system 10 comprising a machine device $12_1$ and at least two capillary network gateways $14_1$, $14_2$. The node $14_1$, 21 comprises:

a processor 60, 80; and
a memory 61, 81 storing instructions that, when executed by the processor, causes the node $14_1$, 21 to:
associate the machine device $12_1$ with at least a first and a second capillary network gateway $14_1$, $14_2$, wherein the first capillary network gateway $14_1$ has a first level of availability and the second capillary network gateway $14_2$ has a second level of availability, and
configuring 52 the machine device $12_1$ with a first and a second capillary network gateway $14_1$, $14_2$, such as to use the first capillary network gateway $14_1$ for communication of a first type of data and use the second capillary network gateway $14_1$ for communication of a second type of data.

In an embodiment, the node $14_1$, 21 is configured to, when several candidate capillary network gateways fulfil availability requirements relating to the first and/or second type of data, associate the machine device $12_1$ to a first and/or second capillary network gateway $14_1$, $14_2$ is further based on one or more of: a channel quality metric, a quality of service metric, security credentials, message relay capability, battery power of the capillary network gateways $14_1$, $14_2$, load of the capillary network gateway $14_1$, $14_2$, load of a capillary network 11, load of a communication system 10 interfacing with the capillary network 11, required uplink transmission power.

In an embodiment, the node $14_1$, 21 is configured to change level of availability of the at least first and second capillary network gateway $14_1$, $14_2$, and repeating the associating 51 and configuring 52.

In an embodiment, the node $14_1$, 21 is configured to increase the transmission power when communicating the first type of data.

Still with reference to FIGS. 7 and 8, the memory 61, 81 can be any combination of read and write memory (RAM) and read only memory (ROM). The memory 61, 81 also comprises persistent storage, which, for example, can be any single one or combination of magnetic memory, optical memory, solid state memory or even remotely mounted memory.

A data memory (not illustrated) may also be provided for reading and/or storing data during execution of software instructions in the processor 60, 80. The data memory can be any combination of read and write memory (RAM) and read only memory (ROM).

The present disclosure also encompasses a computer program product 61, 81 comprising a computer program 62, 82 for implementing the methods as described above, and a computer readable means on which the computer program 62, 82 is stored. The computer program product 61, 81 may be any combination of read and write memory (RAM) or read only memory (ROM). The computer program product 61, 81 may also comprise persistent storage, which for example can be any single one or combination of magnetic memory, optical memory or solid state memory.

The present teachings thus comprise a computer program 62, 82 for a node $14_1$, 21 of a communication system 10 comprising a machine device $12_1$ and at least two capillary network gateways $14_1$, $14_2$. The computer program 62, 82 comprises computer program code, which, when run on the node $14_1$, 21 causes the node $14_1$, 21 to:

associate the machine device $12_1$ with at least a first and a second capillary network gateway $14_1$, $14_2$, wherein the first capillary network gateway $14_1$ has a first level of availability and the second capillary network gateway $14_2$ has a second level of availability, and
configure the machine device $12_1$ with a first and a second capillary network gateway $14_1$, $14_2$, such as to use the first capillary network gateway 14₁ for communication of a first type of data and use the second capillary network gateway 14₁ for communication of a second type of data.

The computer program product, or the memory, thus comprises instructions executable by the processor. Such instructions may be comprised in a computer program, or in one or more software modules or function modules.

Figure 9:
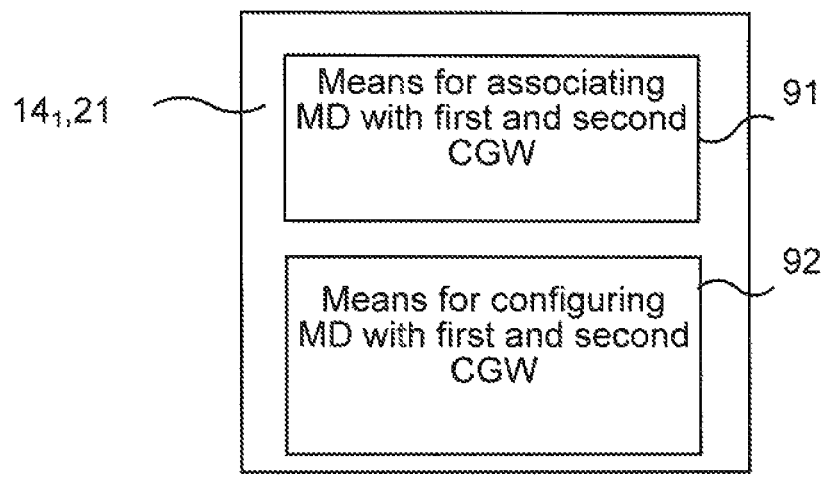
FIG. 9 illustrates a network node comprising functions modules/software modules for implementing methods of the present disclosure.

An example of an implementation using functions modules/software modules is illustrated in FIG. 9. In particular, a node 14₁, 21 comprising function modules for implementing methods of the present disclosure is illustrated. The node 14₁, 21 is a node of a communication system 10 comprising a machine device 12₁ and at least two capillary network gateways 14₁, 14₂. The node 14₁, 21 comprises first means 91, for example a first function module, for associating the machine device 12₁ with at least a first and a second capillary network gateway 14₁, 14₂, wherein the first capillary network gateway 14₁ has a first level of availability and the second capillary network gateway 14₂ has a second level of availability. The node 14₁, 21 comprises second means 92, for example a second function module, for configuring the machine device 12₁ with a first and a second capillary network gateway 14₁, 14₂, such as to use the first capillary network gateway 14₁ for communication of a first type of data and use the second capillary network gateway 14₁ for communication of a second type of data.

The functional modules 91, 92 can be implemented using software instructions such as computer program executing in a processor and/or using hardware, such as application specific integrated circuits, field programmable gate arrays, discrete logical components etc.

The node 14₁, 21 may comprise further such means for implementing the various embodiments as has been described.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for selecting a capillary network gateway for a machine device of a capillary network, wherein the machine device is capable of being associated with at least a first and a second capillary network gateway, wherein the first capillary network gateway has a first level of availability and the second capillary network gateway has a second level of availability, the method comprising:
   selecting, for the machine device, the first capillary network gateway for communication of a first type of data and the second capillary network gateway for communication of a second type of data, wherein the first level of availability comprises availability at all times or a duty cycle equal to or higher than a first availability threshold, and wherein the second level of availability comprises a duty cycle lower than the first availability threshold;
   receiving, in the machine device, messages from two or more capillary network gateways of one or more capillary networks, the messages comprising information about the level of availability of the respective capillary network gateways,
   associating, in the machine device, the machine device with a first and a second capillary network gateway based on the received levels of availability, and
   increasing, in the machine device, transmission power when communicating with the first capillary network gateway.

2. The method as claimed in claim 1, comprising, when receiving messages from several candidate capillary network gateways fulfilling availability requirements relating to the first and/or second type of data, associating to a first and/or second capillary network gateway based further on one or more of: a channel quality metric, a quality of service metric, security credentials, message relay capability, battery power of the capillary network gateways load of the capillary network gateway load of the capillary network load of a communication system interfacing with the capillary network, required uplink transmission power.

3. The method as claimed in claim 1, comprising associating, in the capillary network gateway or in a node of a communication system, the machine device with at least a first and a second capillary network gateway, wherein each capillary network gateway is capable of communication with the communication system, and configuring the machine device with a first and a second capillary network gateway based on established levels of availability of the respective capillary network gateways.

4. The method as claimed in claim 3, wherein, when several candidate capillary network gateways fulfil availability requirements relating to the first and/or second type of data, the associating the machine device to a first and/or second capillary network gateway is further based on one or more of: a channel quality metric, a quality of service metric, security credentials, message relay capability, battery power of the capillary network gateways, load of the capillary network gateway, load of the capillary network, load of a communication system interfacing with the capillary network, required uplink transmission power.

5. The method as claimed in claim 4, comprising changing level of availability of the at least first and second capillary network gateway, and repeating the associating.

6. The method as claimed in claim 1, comprising:
   establishing a parameter value relating to capacity of the first capillary network gateway, and
   selecting, for a parameter value meeting a threshold value, the first capillary network gateway also for the second type of data.

7. A machine device for selecting a capillary network gateway of a capillary network, wherein the machine device is capable of being associated with at least a first and a second capillary network gateway, wherein the first capillary network gateway has a first level of availability and the second capillary network gateway has a second level of availability, the machine device comprising:
   a processor; and
   a memory storing instructions that, when executed by the processor, causes the machine device to:
   select the first capillary network gateway for communication of a first type of data and the second capillary network gateway for communication of a second type of data, wherein the first level of availability comprises availability at all times or a duty cycle equal to or higher than a first availability threshold, and wherein the second level of availability comprises a duty cycle lower than the first availability threshold;
   receiving messages from two or more capillary network gateways of one or more capillary networks, the messages comprising information about the level of availability of the respective capillary network gateways, associating the machine device with a first and a second capillary network gateway based on the received levels of availability; and configured to increase transmission power when communicating with the first capillary network gateway.

8. The machine device as claimed in claim 7, configured to, when receiving messages from several candidate capillary network gateways fulfilling availability requirements relating to the first and/or second type of data, associate to a first and/or second capillary network gateway based further on one or more of: a channel quality metric, a quality of service metric, security credentials, message relay capability, battery power of the capillary network gateways, load of the capillary network gateway, load of the capillary network, load of a communication system interfacing with the capillary network, required uplink transmission power.

9. The machine device as claimed in claim 7, comprising:

establishing a parameter value relating to capacity of the first capillary network gateway, and selecting, for a parameter value meeting a threshold value, the first capillary network gateway also for the second type of data.

10. A node of a communication system comprising a machine device and at least two capillary network gateways, the node comprising:

a processor; and a memory storing instructions that, when executed by the processor, causes the node to:

associate the machine device with the first capillary network gateway for communication of a first type of data and the second capillary network gateway for communication of a second type of data, wherein the first level of availability comprises availability at all times or a duty cycle equal to or higher than a first availability threshold, and wherein the second level of availability comprises a duty cycle lower than the first availability threshold;

configure the machine device to receive, messages from two or more capillary network gateways of one or more capillary networks, the messages comprising information about the level of availability of the respective capillary network gateways; and associate the machine device with a first and a second capillary network gateway based on the received levels of availability; and wherein the node is configured to increase the transmission power when communicating the first type of data.

11. The node as claimed in claim 10, configured to, when several candidate capillary network gateways fulfil availability requirements relating to the first and/or second type of data, associate the machine device to a first and/or second capillary network gateway is further based on one or more of: a channel quality metric, a quality of service metric, security credentials, message relay capability, battery power of the capillary network gateways, load of the capillary network gateway, load of a capillary network, load of a communication system interfacing with the capillary network, required uplink transmission power.

12. The node as claimed in claim 10, configured to change level of availability of the at least first and second capillary network gateway, and repeating the associating and configuring.

* * * * *